April 20, 1926.

W. BENNHOLD

GAS PRODUCER WITH A REVOLVING GRATE

Filed August 18, 1920

Inventor.
Walter Bennhold
By B. Singer, Atty.

Patented Apr. 20, 1926.

1,581,159

UNITED STATES PATENT OFFICE.

WALTER BENNHOLD, OF FURSTENWALDE, GERMANY, ASSIGNOR TO JULIUS PINTSCH AKTIEN-GESELLSCHAFT, OF BERLIN, GERMANY.

GAS PRODUCER WITH A REVOLVING GRATE.

Application filed August 18, 1920. Serial No. 404,465.

(GRANTED UNDER THE PROVISIONS OF THE ACT OF MARCH 3, 1921, 41 STAT. L., 1313.)

*To all whom it may concern:*

Be it known that I, WALTER BENNHOLD, a citizen of the German Republic, residing at Furstenwalde, Province of Brandenburg, Germany, have invented a new and useful Gas Producer with a Revolving Grate, for which I have filed applications for patents in the following countries: Germany No. 284,264, 26th of March, 1914; Austria No. 74,237, 24th of June, 1916; Hungary No. 71,715, 13th of July, 1916; Belgium No. 288,159, 30th of June, 1920; Great Britain No. 146,946, 6th of July, 1920; France No. 523,926, 8th of July, 1920; Czechoslovakia No. 3,649, 24th of June, 1916; Poland No. 8,594, 21st of June, 1920.

The following is a description of my invention:—

The size and capacity of gas producers with revolving grates heretofore generally used are necessarily restricted in order that the removal of ashes will be equal at all points and a uniform distribution of the mixture of steam and air and a uniform reduction into gas within the incandescent layer of fuel may be obtained. In large gas plants it is therefore necessary to erect very many of these producers, the cost of which is very great. If, however, the shaft of the producer is made annular, so that the distance between the interior and exterior walls of the shaft does not exceed the practicable inside diameter of the usual type of producers and an annular grate is also employed, the size and capacity of the producer can be greatly increased. The object of my invention is to construct an improved apparatus embodying such constructions, and which is adapted for use for the production of gas of the producer type as well as for the type of water gas, as hereinafter described and claimed.

Figure 1:
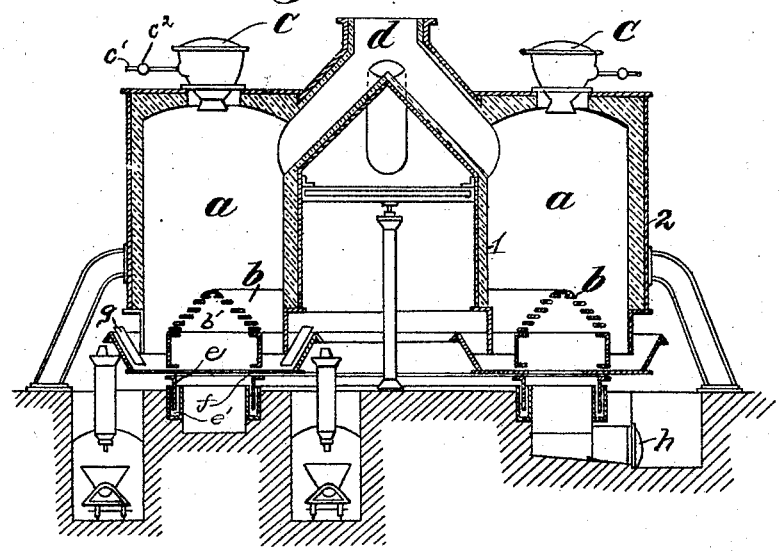
Figure 2:
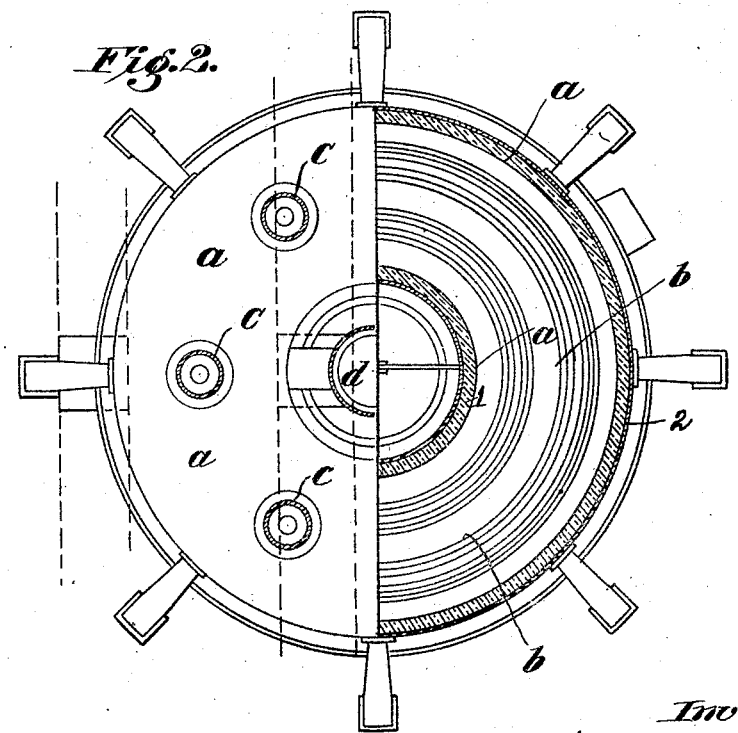

In the accompanying drawing showing an annular gas producer according to the invention by way of example Figure 1 is a longitudinal section and Figure 2 is a part top plan view and part cross section of Figure 1.

$a$ is the annular producer, $b$ the annular revolving grate, $c$ are the fuel hoppers and $d$ the gas outlet passage. Said fuel hoppers $c$ have supply pipes $c'$ provided with valves $c^2$. The producer $a$ is stationary, as is obvious from the drawing, and has an annular body presenting spaced interior and exterior walls, indicated respectively at 1 and 2. The ash pan $f$ supports the annular grate $b$ as well as the annular air excluding walls $e$ which reach into the seal $e'$, and the pan and walls rotate with said grate during the operation of the producer. The rotation is accomplished by any driving device used in connection with revoluble grate producers, and especially is not part of the present invention. It will be observed by reference to the drawing that the bars of the grate are not only annular (Fig. 2) but that they are arranged in downwardly diverging relation so that the grate is much wider at the base than at the top, and that the same is hollow in the underside as indicated at $b'$. This showing is especially clear in Figure 1. Mixed steam and air enter beneath the grate through the duct $g$. The means for removing the ashes from the rotating ash pan is indicated at $h$.

Having thus described my invention, what I claim is:—

1. A gas producer having an annular body presenting spaced exterior and interior walls, fuel hoppers above the annular chamber formed between such walls, gas outlet passages leading from said chamber through said inner wall, and an annular grate arranged in the bottom of said annular chamber.

2. A gas producer having an annular body presenting spaced exterior and interior walls, fuel hoppers above the annular chamber formed between such walls, gas outlet passages leading from said chamber through said inner wall, and an annular grate arranged in the bottom of said annular chamber, the bars of said grate being annular and being arranged in downwardly diverging relation.

In testimony whereof I affix my signature.

WALTER BENNHOLD.